(12) United States Patent
Ma et al.

(10) Patent No.: US 9,311,406 B2
(45) Date of Patent: Apr. 12, 2016

(54) DISCOVERING TRENDING CONTENT OF A DOMAIN

(71) Applicant: Microsoft Corporation, Redmond, WA (US)

(72) Inventors: Tianchi Ma, Sammamish, WA (US); Deepak Vijaywargi, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 13/910,777

(22) Filed: Jun. 5, 2013

(65) Prior Publication Data
US 2014/0365452 A1 Dec. 11, 2014

(51) Int. Cl.
*G06F 7/00* (2006.01)
*G06F 17/30* (2006.01)

(52) U.S. Cl.
CPC .................. *G06F 17/30864* (2013.01)

(58) Field of Classification Search
CPC .......... G06F 17/3053; G06F 17/30554; G06F 17/3064; G06F 17/30864; G06F 17/30867
USPC ......................................................... 707/706
See application file for complete search history.

(56) References Cited

U.S. PATENT DOCUMENTS

| | | | |
|---|---|---|---|
| 7,562,076 B2 | 7/2009 | Kapur | |
| 8,135,706 B2 * | 3/2012 | Yu ..................... | G06F 17/30864 705/14.49 |
| 8,364,647 B1 * | 1/2013 | Eastlund ................ | G06Q 30/02 707/666 |
| 8,364,669 B1 | 1/2013 | Chowdhury et al. | |
| 8,370,348 B1 | 2/2013 | Reilly et al. | |
| 8,402,031 B2 | 3/2013 | Govani et al. | |
| 8,407,204 B2 | 3/2013 | Carver | |
| 8,429,170 B2 * | 4/2013 | Ittiachen ........... | G06F 17/30699 707/747 |
| 8,452,772 B1 * | 5/2013 | Carpio et al. ................. | 707/737 |
| 8,458,193 B1 * | 6/2013 | Procopio ........... | G06F 17/30616 707/749 |
| 2008/0126318 A1 * | 5/2008 | Frankovitz ....................... | 707/3 |
| 2010/0100537 A1 * | 4/2010 | Druzgalski et al. ........... | 707/713 |
| 2010/0169492 A1 * | 7/2010 | Lee ......................... | G06Q 30/02 709/226 |
| 2010/0211432 A1 | 8/2010 | Yiu et al. | |

(Continued)

OTHER PUBLICATIONS

Cyrus, Shepard, "Freshness Factor: 10 Illustrations on How Fresh Content Can Influence Rankings", Retrieved at <<http://www.seomoz.org/blog/google-fresh-factor>>, Dec. 12, 2011, pp. 32.

(Continued)

*Primary Examiner* — Hosain Alam
*Assistant Examiner* — Nicholas Allen
(74) *Attorney, Agent, or Firm* — Dave Ream; Tom Wong; Micky Minhas

(57) ABSTRACT

Systems and methods for identifying trending content on one or more domains is presented. In response to receiving a request for trending content on each domain of a set of domain, network activity data corresponding to network activity of a recent period of time is obtained. According to various embodiments, the network activity data corresponds to activity in the immediately previous time period and includes any of query logs from one or more search engines, social data from one or more social network sites, and browsing data corresponding to the browsing history of a plurality of computer users. Trending content from the network activity data for each domain of the set of domains is identified and the identified content is returned in response to the received request.

16 Claims, 11 Drawing Sheets

(56) References Cited

U.S. PATENT DOCUMENTS

| | | | |
|---|---|---|---|
| 2011/0119279 A1* | 5/2011 | Wacker | G01D 1/00 707/754 |
| 2011/0218946 A1 | 9/2011 | Stern et al. | |
| 2011/0282874 A1* | 11/2011 | Xu | G06F 17/30616 707/737 |
| 2011/0307403 A1* | 12/2011 | Rostampour et al. | 705/325 |
| 2011/0307464 A1* | 12/2011 | Ghosh | G06F 17/30899 707/706 |
| 2011/0320715 A1 | 12/2011 | Ickman et al. | |
| 2012/0166438 A1* | 6/2012 | Wu | G06F 17/3064 707/737 |
| 2012/0203895 A1* | 8/2012 | Jaudon | G06F 11/3006 709/224 |
| 2012/0254152 A1* | 10/2012 | Park | G06Q 30/02 707/710 |
| 2012/0271691 A1* | 10/2012 | Hammad et al. | 705/14.17 |
| 2012/0271829 A1 | 10/2012 | Jason | |
| 2012/0271844 A1 | 10/2012 | Selbie et al. | |
| 2012/0278164 A1* | 11/2012 | Spivack et al. | 705/14.52 |
| 2012/0284738 A1* | 11/2012 | Narasimhan et al. | 725/16 |
| 2012/0290950 A1* | 11/2012 | Rapaport et al. | 715/753 |
| 2012/0317593 A1 | 12/2012 | Myslinski | |
| 2013/0046584 A1* | 2/2013 | Yu et al. | 705/7.38 |
| 2013/0060858 A1* | 3/2013 | Freishtat et al. | 709/204 |
| 2013/0086171 A1* | 4/2013 | Sayankar | G06Q 50/01 709/204 |
| 2013/0097153 A1* | 4/2013 | Barbieri | G06F 17/30817 707/722 |
| 2013/0103429 A1* | 4/2013 | Buitrago | G06Q 40/08 705/4 |
| 2013/0110823 A1* | 5/2013 | Su | G06F 17/30867 707/723 |
| 2013/0124417 A1* | 5/2013 | Spears et al. | 705/44 |
| 2013/0124653 A1* | 5/2013 | Vick | H04L 51/32 709/206 |

OTHER PUBLICATIONS

"Interaction Model for Serving Popular Queries in Search Box", U.S. Appl. No. 13/671,589, filed Nov. 8, 2012, pp. 26.

* cited by examiner

DISCOVERING TRENDING CONTENT OF A DOMAIN

BACKGROUND

There are numerous online sources of content available to computer users via the Internet. There are news sites that host the latest news, video and image sites hosting the latest content that has been posted by others, blogs touching on numerous subjects, social network sites where members of one's social network post and share all content of all types and forms, and the like. Each different domain hosts content for a computer user view, interact with, and/or access. There are so many different sources of content that it is difficult and time consuming to keep up with the latest content on each site. Yet, for many, a daily ritual is to visit numerous web sites to keep abreast of what is going on.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, a computer-implemented method for identifying trending content is presented. In this method, a request for trending content on each domain of a set of domains is received. Network activity data corresponding to network activity of a recent period of time is obtained. Network activity data may comprise any of query logs from one or more search engines or other services that respond to search queries, social data from one or more social network sites, and browsing data corresponding to the browsing history of a plurality of computer users on a network. Trending content from the network activity data for each domain of the set of domains is identified and the identified content is returned in response to the received request.

According to additional aspects of the disclosed subject matter, a computer implemented method and/or computer-readable media) bearing computer-executable instructions for carrying out a computer implemented method are presented. A request for trending content on each domain of a set of domains is received from a requesting computer user. Network activity data corresponding to network activity of a recent period of time is obtained. According to various aspects of the disclosed subject matter, the network activity data comprises any of query logs of search queries obtained one or more search engines, social network data of social content from one or more social networking sites, and browsing data of browsing history of a plurality of computer users. A first set of trending content candidates is identified from query logs in the network activity data. A second set of trending content candidates is identified from social network data in the network activity data. Further, a third set of trending content candidates is identified from browsing data of the network activity data. The first, second and third sets of trending content candidates are aggregated according to the domains of the trending content candidates. For each domain of the set of domains, a subset of the trending content candidates for the domain is identified from the aggregated set of trending content candidates as the trending content for the domain and the identified subsets of trending content are returned in response to the received request.

According to further aspects of the disclosed subject matter, a computer system for identifying trending topics is presented. The computer system comprises a processor and a memory, wherein the processor executes instructions stored in the memory as part of or in conjunction with additional components to identify trending topics on one or more domains. The additional components include a network communication component configured to communicate with one or more external devices over a network. Also included in the computer system is a query log processing component to identify a first set of trending content candidates from the query logs of the network activity data. A social data processing component identifies a second set of trending content candidates from the social network data of the network activity data. Also, a browsing history processing component of the computer system identifies a third set of trending content candidates from the browsing data of the network activity data. An aggregation component aggregates the various sets of trending content candidates according to the domain of the trending content candidates and identifies a subset of the trending content candidates for the domain from the aggregated set of trending content candidates as the trending content for the domain. The identified trending content is returned in response to a request for trending content.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposed of clarity, the term "exemplary" in this document should be interpreted as serving as an illustration or example of something, and it should not be interpreted as an ideal and/or a leading illustration of that thing. Further, the term "content," as used in this document, refers to the textual, visual or aural subject matter that is encountered as part of the user experience encounters as a user navigates a browser to a network site. The content may include, by way of illustration and not limitation: text, images, video, sound, animations, and the like. The term "trending content," sometimes referred to as "viral content," refers to content on one or more network sites that enjoys a temporal and significant measure of popularity (in terms of computer users viewing/experiencing the content) and/or content on one or more network sites whose popularity is increasing.

The term "domain" refers to a group of computers and related devices on a network, such as the Internet, that are administered as a unit with common rules and procedures. A domain is defined by its IP address. All devices sharing a common part of the IP address are said to be in/part of the same domain.

Figure 1:
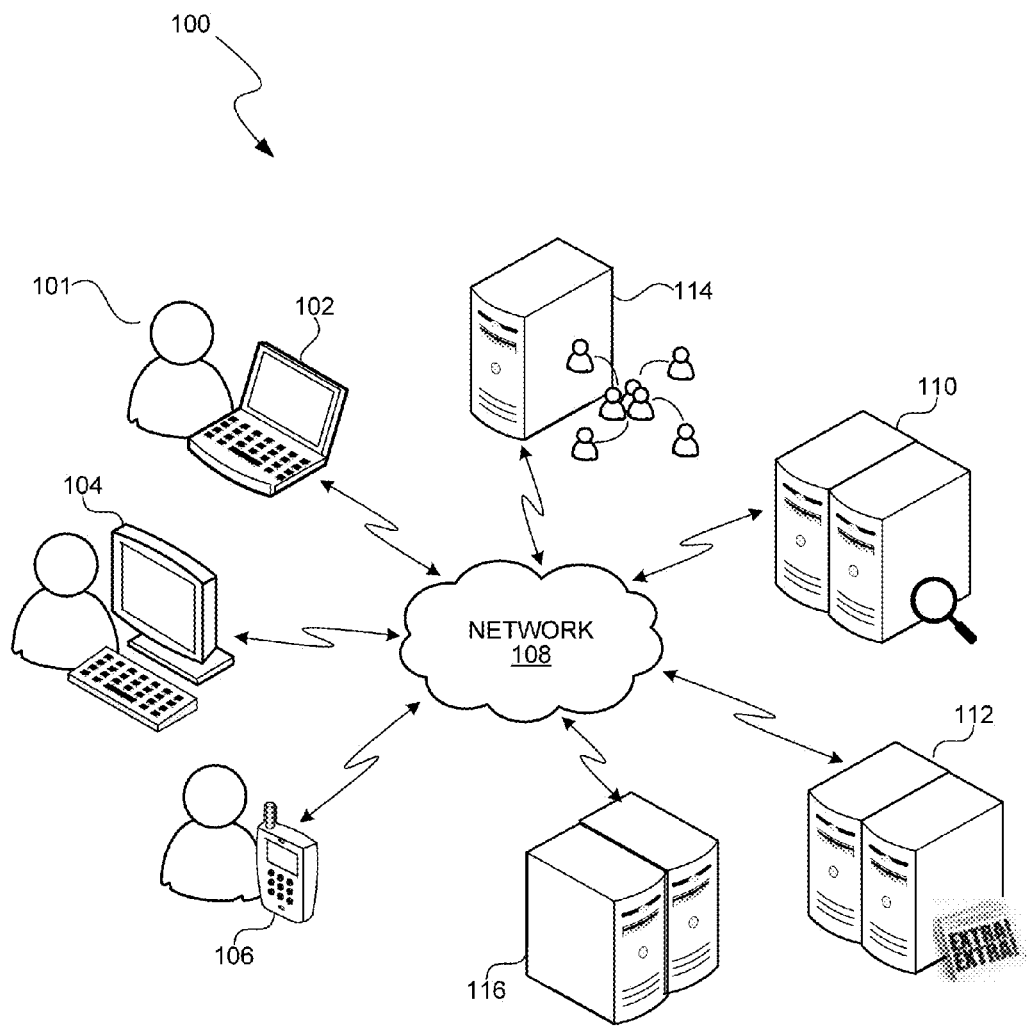
FIG. 1 is a network environment suitable for implementing aspects of the disclosed subject matter.

Aspects of the disclosed subject matter may be best understood with regard to the figures. Thus, turning to the figures, FIG. 1 is a network environment 100 suitable for implementing aspects of the disclosed subject matter, particularly in regard to identifying and providing trending content on one or more domains. The exemplary networked environment 100 includes one or more user computers, such as user computers 102-106, connected to a network 108, such as the Internet, a wide area network or WAN, and the like. User computers may include, by way of illustration and not limitation: desktop computers (such as desktop computer 104); laptop computers (such as laptop computer 102); tablet computers (such as tablet computer 106); mobile devices (not shown); game consoles (not shown); personal digital assistants (not shown); and the like. User computers may be configured to connect to the network 108 by way of wired and/or wireless connections.

Also connected to the network 108 are various networked sites, including network sites 110-116. By way of example and not limitation, the networked sites connected to the network 108 include a search engine 110 configured to respond to news queries from computer users, news site 112 that hosts various items of news content, social network site 114 which hosts content posted by one or more computer user, and the like. A computer user, such as computer user 101, may navigate by way of a network browser executing on a user computer, such as user computer 102, to these and other networked sites to access content, including news content.

Though only one social network site 114 is included in the illustrative network environment 100, this should not be viewed as limiting upon the disclosed subject matter. In an actual embodiment, there may be any number of social network sites connected to the network 108. Social network data (as a part of network activity data) may be obtained from any number of social network sites connected to the network 108. Similarly, while only one news site 112 is illustrated in the exemplary network environment 100, this is illustrative and should not be construed as limiting upon the disclosed subject matter. As is readily appreciated by those skilled in the art, in an actual embodiment there may be numerous news sites connected to a network, such as network 108, each news site hosting items of news content that may be viewed by computer users. These news sites, including news site 112, may be the originators of the news content and/or may simply host or reference news content from other news sources.

As mentioned above, network activity data may also be obtain from one or more search engines, such as search engine 110. A search engine may be able to provide query logs (as part of network activity data that is periodically obtained to identify trending content on one or more domains) which, when analyzed, provide information regarding for what content computer users are searching as well as click-through information which is data that identifies which of many results a computer user has selected. Other network sites (not shown) are also used to obtain network activity data. For example, various network sites may be queried regarding browsing data—the network locations/sites that a plurality of computer users visits. In addition to navigating to a network site, network activity data may comprise information regarding the number of posts and/or social communications made to a particular site, including social network sites, blogs, and the like.

As indicated above, the network environment also includes trending content site 116. According to aspects of the disclosed subject matter, the trending content site 116 is configured to periodically obtain network activity data (comprising query logs, social network data, and browsing data) from various sourced on the network 108, identify trending content for one or more domains on the network, and respond to trending content requests from one or more services over the network, all of which is described in greater detail below. Of course, while the trending content site 116 is illustrated as a network site, it should be appreciated that all or some of the functionality of the trending content site may be implemented as an online service for identify and providing trending content on one or more domains in the network 108. Accordingly, the illustrated network environment 100 should be viewed as illustrative and not as a limiting embodiment of the disclosed subject matter.

Figure 2:
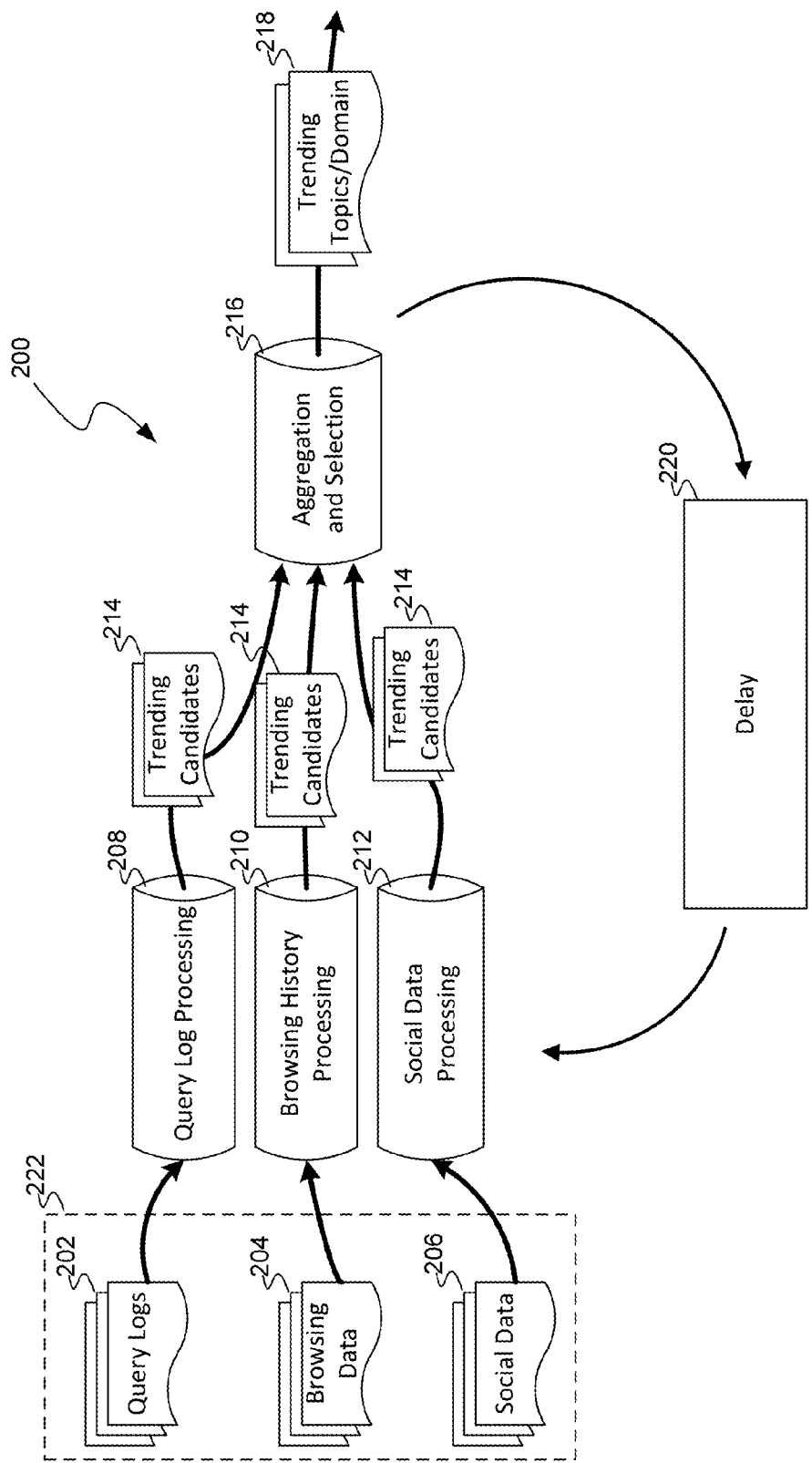
FIG. 2 is a block diagram illustrating a general flow of information in processing network activity data to identifying trending content on one or more domains on a network.

To further illustrate how the trending content site 116 identifies trending content on domains on the network 108, reference is now made to FIG. 2. FIG. 2 is a block diagram illustrating a general flow 200 of information in processing network activity data to identifying trending content on one or more domains on the network 108. As shown in FIG. 2, network activity data 222 comprising query logs 202, browsing data 204, and social network data 206 is obtained for processing. Each type of network activity data 222 is process by components of a trending content service (such may be implemented by trending content site 116) according to the type/nature of the obtained data. For example, a query logs processing component 208 processes the query logs 202 to generate trending content candidates 214. Similarly, a browsing history processing component 210 processes the browsing history 204, and a social data processing component 212 processes the social data 206, each also producing trending content candidates 214. An aggregation and selection component 216 aggregates the trending content candidates 214 according to domain and selects trending content 218, organized according to domain. According to aspects of the disclosed subject matter, the trending content 218 may be stored for access by other modules and/or process or be provided in response to a request for trending content on one or more domains. Thereafter, the process may delay for some period of time, as indicated by delay 220, and then repeat the obtaining of network activity data 222 and processing that data to produce the latest trending content on one or more domains.

Figure 3:
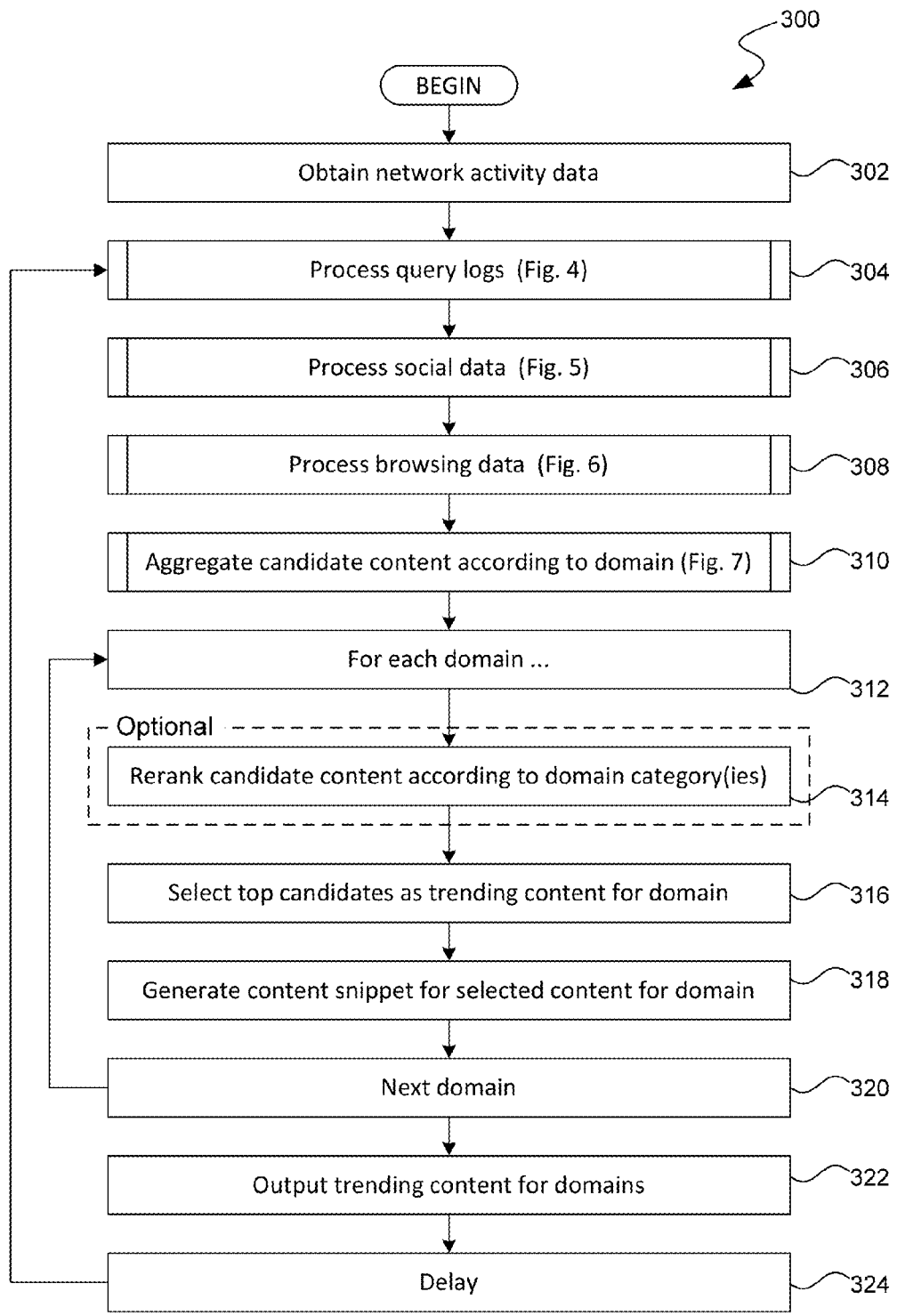
FIG. 3 is a flow diagram illustrating an exemplary routine for processing network activity data to identifying trending content on one or more domains on a network.

To further illustrate the general flow of information in processing network activity data to identifying trending content on one or more domains on the network 108, reference is now made to FIG. 3. FIG. 3 is a flow diagram illustrating an exemplary routine 300 for processing network activity data 222 to identifying trending content on one or more domains on a network 108. Beginning at block 302, network activity data 222 is obtained for processing. As discussed above, network activity data may comprise query logs 202 obtained from one or more search engines, browsing data 204 corresponding to the browsing history of a plurality of computer users, and social data 206 obtained from one or more social network sites. It should be appreciated that network activity data 222 is recent data, i.e., data corresponding to activity within a most recent prior period of time, i.e., the period of time immediately preceding the time that the network activity data is obtained. In one non-limiting embodiment, the network activity data 222 corresponds to data (including any of query logs, browsing data, and social data) occurring in the 6 hours preceding obtaining the data, though in various alternative embodiments the amount of time may be different, e.g., 2 hours, 24 hours, etc.

Figure 4:
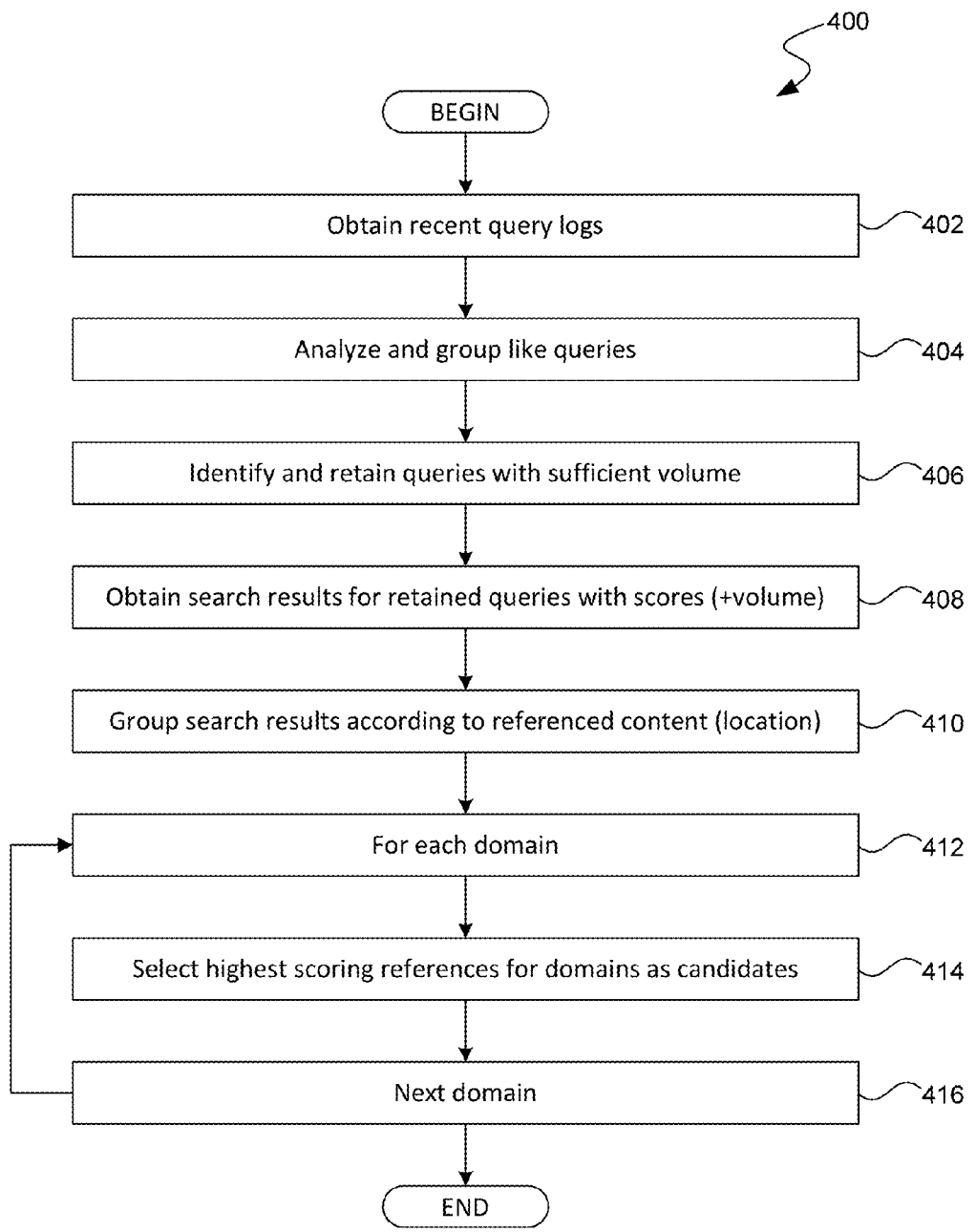
FIG. 4 is a flow diagram illustrating an exemplary routine for identifying trending content candidates from query logs obtained from one or more search engines.

At block 304, query logs 202 of the network activity data 222 are processed to generate trending content candidates 214. A more detailed description of processing query logs 202 is set forth in regard to FIG. 4. More particularly, FIG. 4 is a flow diagram illustrating an exemplary routine 400, suitably for use by routine 300, for identifying trending content candidates 214 from query logs 202 obtained from one or more search engines. Beginning at block 402, the routine 400 identifies the query logs 202 from the network activity data 222. At block 404, queries from the query logs 202 are analyzed and like or similar queries are grouped together. At block 406, those queries (or grouped queries) with sufficient volume (i.e., were submitted to a search engine a given number of times) are retained for further processing. The remainder of the search queries is discarded for purposes of this routine 400. According to aspects of the disclosed subject matter, determining whether a search query (or group of like search queries) have sufficient volume may be determined according to a predetermined threshold number. Alternatively, or additionally, determining whether a search query (or group of like search queries) have sufficient volume may be determined according to a predetermined ratio; that the search query (or group of like search queries) comprise at least a predetermined percentage of the total volume of search queries identified by the query logs 202.

At block 408, search results for the retained search queries are obtained. The search results are obtained from one or more of the search engines, such as search engine 110. According to one embodiment, the search results are obtained from one or more search engines according to APIs associated with the search engines. Further, according to additional aspects of the disclosed subject matter, the obtained search results will include corresponding rankings and scores for the search results. At block 410, the search results are grouped according to network location. Moreover, as will be readily understood, each network location will belong to a domain on the network. Thus, at block 412, an iteration loop is begun to iterate through a set of domains for which trending content will be identified. Hence, at block 414, the highest scoring search results (references to content) for the currently iterated domain are selected as trending content candidates for the domain. At block 416, the next domain of the set of domains is selected and the routine returns to block 412. Alternatively, if the iteration loop has generated trending content candidates for each of the domains, the routine 400 terminates.

Figure 5:
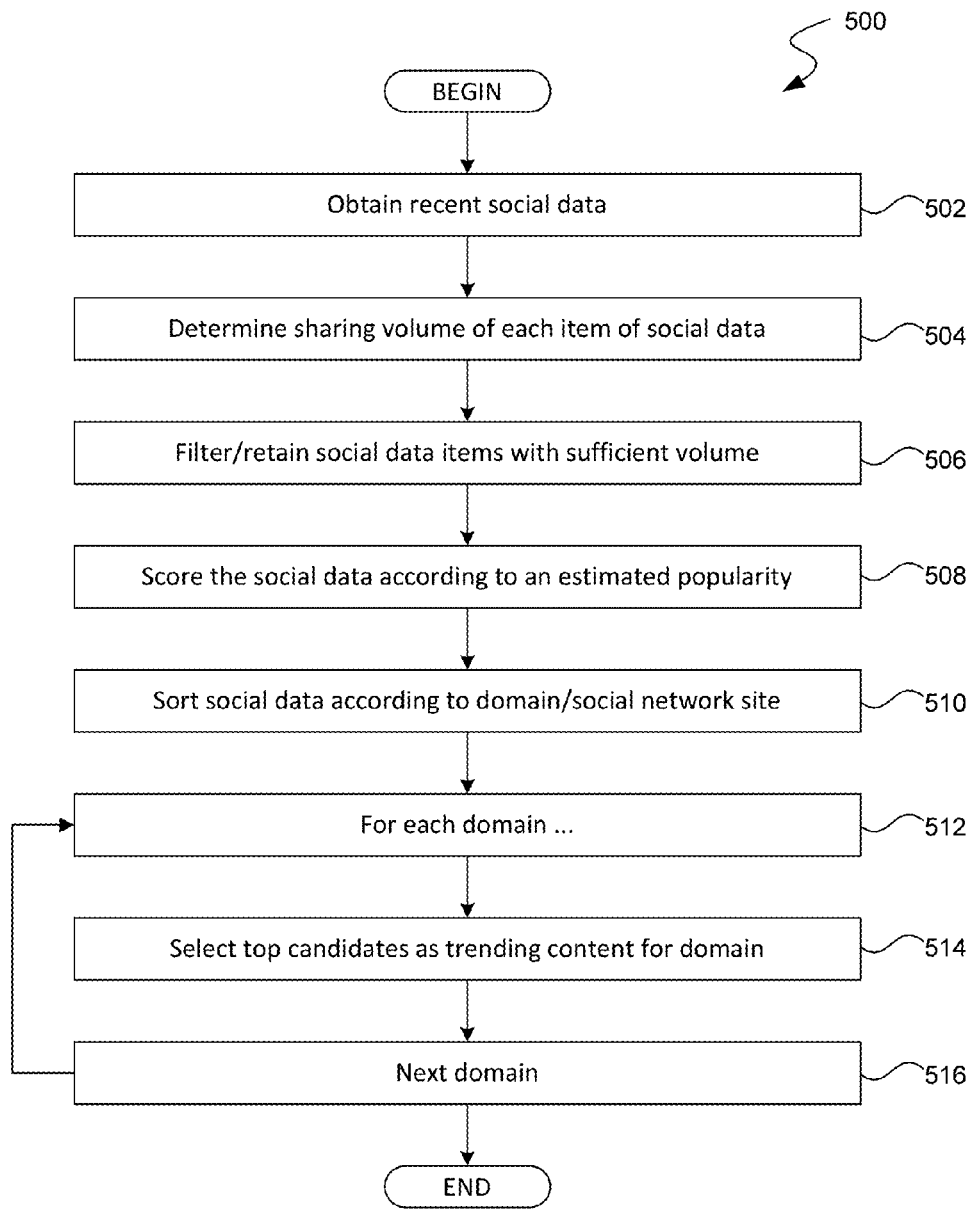
FIG. 5 is a flow diagram illustrating an exemplary routine for identifying trending content candidates from social data obtained from one or more social network sites.

Returning again to FIG. 3, in addition to processing query logs, at block 306 the exemplary routine 300 processes the social data 206 of the network activity data 222. A more detailed description of processing query logs 202 is set forth in regard to FIG. 4. More particularly, FIG. 5 is a flow diagram illustrating an exemplary routine 500, suitably for use by routine 300, for identifying trending content candidates from social data 206 obtained from one or more social network sites. According to aspects of the disclosed subject matter, the social data 206 may correspond to social data from a set of any users on the one or more social network sites. Alternatively, upon an indication in the request for trending content on one or more domains, the social data may correspond to social data from the one or more social networking sites that includes only data of members of the requesting computer user's social network.

Beginning at block 502, the query logs 202 are identified from the network activity data 222 corresponding to the immediately preceding time period. At block 504, the social data is grouped according to the corresponding domain (e.g., the social network site from which the social data is obtained). At block 506, the activity volume (i.e., the number of times a particular item was shared, commented upon, liked or preferred, posted, etc.) for each item of the social data 206 is determined (typically from its originating social network site) if the data is not already included with the social data 206.

At block 508, each item of social data is scored to an estimated popularity. According to various embodiments, this estimated popularity is based on the activity volume of each item of social data. At block 510, an iteration loop is begun to iterate through each of the domains represented in the social data, iterating for the purpose of identifying trending content candidates from the social data. Thus, at block 512, the top scoring (according to the estimated popularity and/or activity volume) items of social content for the currently iterated domain are selected as trending content candidates 214 from the social data. At block 514, the next domain of the domains represented in the social data is selected and the routine returns to block 510. Alternatively, if the iteration loop has completed iterating through each of the domains represented in the social content, the routine 500 terminates.

Figure 6:
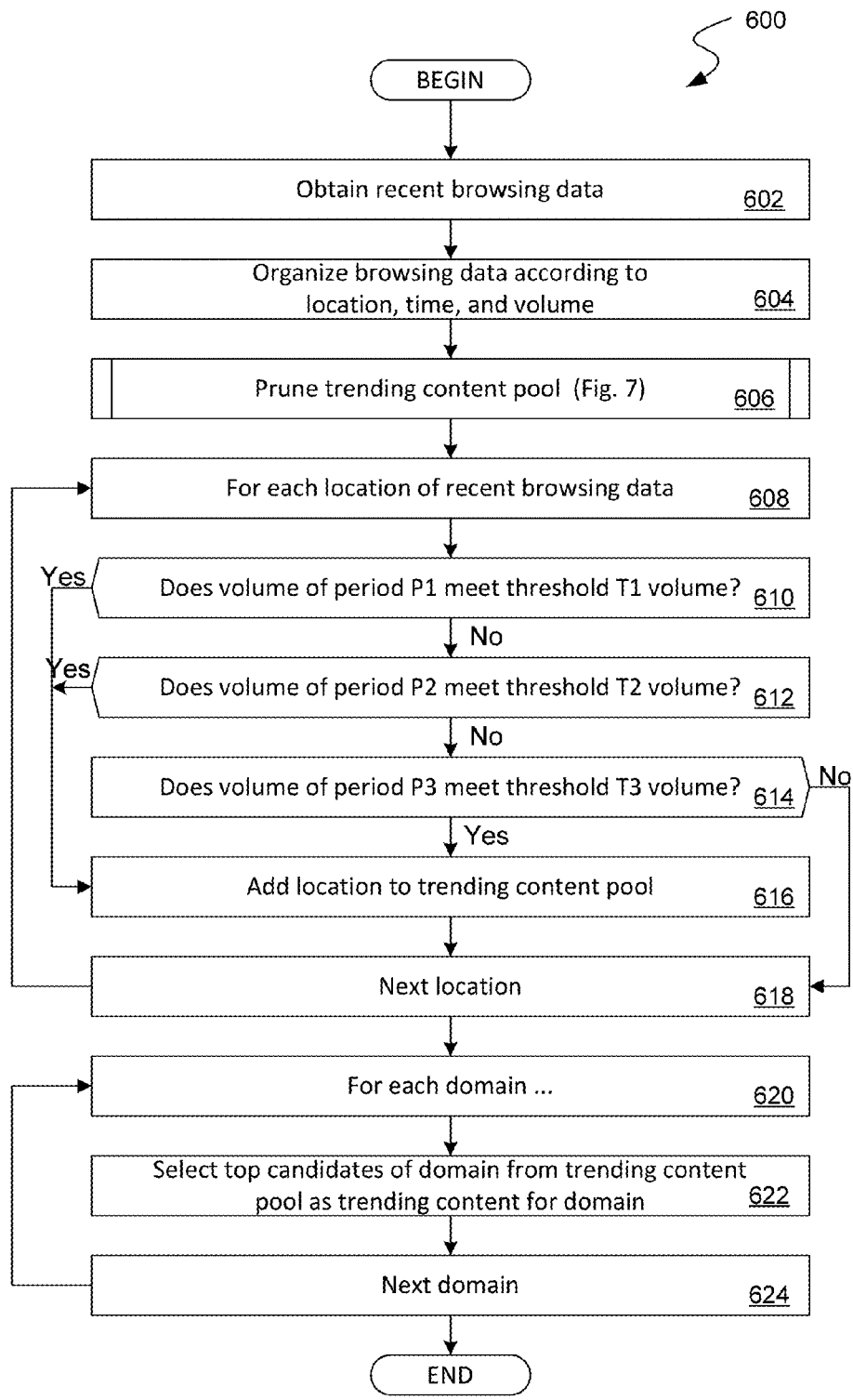
FIG. 6 is a flow diagram illustrating an exemplary routine for identifying trending content candidates from browsing data of a plurality of computer users.

Returning again to FIG. 3, in addition to processing query logs and social data, at block 308 the exemplary routine 300 processes the browsing data 204 of the network activity data 222. A more detailed description of processing browsing data 204 is set forth in regard to FIG. 6. More particularly, FIG. 6 is a flow diagram illustrating an exemplary routine 600, suitably for use by routine 300, for identifying trending content candidates from browsing data of a plurality of computer users. At block 602, recent browsing data of a plurality of computer users is identified from the network activity data 222 obtained in block 302 of FIG. 3. At block 604, if the browsing data is not already so organized, the data is organized according to domain location (the URL of the location/content that was visited or accessed), time (when the URL was visited/accessed), and volume (the number of times that the URL was visited/accessed.)

Figure 7:
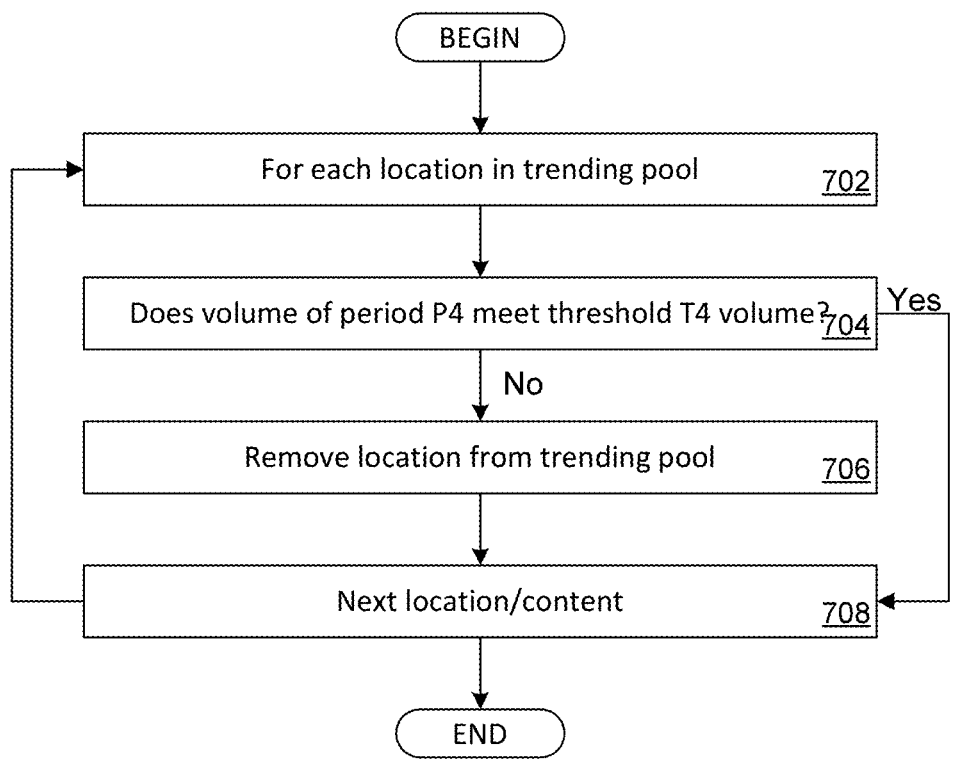
FIG. 7 is a flow diagram illustrating an exemplary routine for pruning trending content candidates from a trending content pool.

At block 606, a trending content pool is pruned, i.e., content (referenced by a location) that is no longer trending content is removed from the trending content pool. The trending content pool is a persistent storage area that stores trending content candidates that were previously identified from browsing data. Pruning the trending content pool is discussed in greater detail with regard to FIG. 7. More particularly, FIG. 7 is a flow diagram illustrating an exemplary routine 700, as used by routine 600, for pruning trending content candidates from the trending content pool.

Beginning at block 702, an iteration loop is begun to iterate through each location (a previously identified trending content candidate) in the trending content pool with the intent of determining whether to prune the location from the trending content pool. At block 704, a determination is made as to whether the visited/accessed volume of the location for (or relating to) a period P0 meets a predetermined threshold volume. According to one embodiment, the period P0 corresponds to the previous 24 hours and the predetermined threshold volume corresponds to half of the visited/accessed volume of the location during the 24 hours preceding period P0. Stated slightly differently, a determination is made as to whether the visited/accessed volume on the location for the past 24 hours is more than half of the visited/accessed volume on the same location for the 24 hours before the past 24 hours. Of course, in alternative embodiments, different time periods and/or threshold volumes may be used. If the visited/accessed volume of the location during period P0 fails to meet the predetermined threshold volume, at block 706 the location is removed from the trending pool. Thereafter, the routine proceeds to block 708. At block 704, if in the alternative the visited/accessed volume of the location meets or exceeds the predetermined threshold volume, the routine proceeds directly to block 708.

At block 708, the next location in the trending pool is selected for iteration and the process returns to block 702. Alternatively, if there are no additional locations in the trending pool that have not been examined, the routine 700 terminates.

Returning again to FIG. 6, in addition to pruning the date trending content pool, at block 608 and iteration loop is begun to iterate through each location of the recent browsing data. Thus, at block 610 a determination is made as to whether the visited/accessed volume for the current location corresponding to a time period P1 meets a threshold volume T1. According to one embodiment, period P1 corresponds to the most recent six hours and the threshold volume T1 corresponds to the visited/accessed volume for the current location for the 24 hours immediately preceding time period P1. If the visited/accessed volume of the current location during time period P1 meets or exceeds the threshold volume T1, the routine 600 proceeds to block 616 where the current location is added to the trending content pool. Alternatively, if the visited/accessed volume of the current location during time period P1 fails to meet the threshold volume T1, the routine proceeds to block 612.

At block 612, a determination is made as to whether the visited/accessed volume for the current location of period P2 meets a threshold volume T2. According to one embodiment, period P2 corresponds to the most recent 24 hours and the threshold volume T2 corresponds to the visited/accessed volume for the current location for the 72 hours immediately preceding time period P2. If the visited/accessed volume of the current location during time period P2 meets or exceeds the threshold volume T2, the routine 600 proceeds to block 616 where the current location is added to the trending content pool. Alternatively, if the visited/accessed volume of the current location during time period P2 fails to meet the threshold volume T2, the routine 600 proceeds to block 614.

At block 614, a determination is made as to whether the visited/accessed volume for the current location of time period P3 meets a threshold volume T3. According to one embodiment, period P3 corresponds to the most recent 48 hours and the threshold volume T3 corresponds to the visited/accessed volume for the current location for the previous 168 hours immediately preceding time period P3. If the visited/accessed volume of the current location during time period P3 meets or exceeds the threshold volume T3, the routine 600 proceeds to block 616 where the current location is added to the trending content pool. Thereafter, the routine proceeds to block 618. Alternatively, at block 614, if the visited/accessed volume of the current location during time period P3 fails to meet the threshold volume T3, the routine 600 proceeds to block 618.

At block 618, if there are additional locations to iterate, the next location is selected and the routine 600 returns again to block 608 to process the next location. Alternatively, if there are no more locations to iterate, the routine 600 proceeds to block 620. At block 620, an iteration loop is begun to iterate through each of the domains represented by the content in the trending content pool. Thus, at block 622, top candidates for the currently iterated domain are selected from the trending content pool as trending content candidates for the current domain. At block 624, the next domain of the domains to iterate is selected and the routine returns to block 620. Alternatively, at 624 if there are no additional domains to iterate, the routine 600 terminates.

Returning again to FIG. 3, at block 310, the trending content candidates generated by the processing of the query logs, the social data, and the browsing data (as discussed above) is aggregated according to domain. At block 312, and iteration loop is begun to iterate through the various domains represented by the aggregated trending content candidates. Thus, at block 314, the trending content candidates corresponding to the currently iterated domain are optionally filtered according to the domains segment for the currently iterated domain. For example, trending content candidates of a domain whose focus is to host video content may be filtered such that any trending content candidates that do not reference video content are filtered out of the trending content candidates for that domain. Similarly trending content candidates of a domain whose focus is to news content may be filtered such that trending content candidates that are not directed to news are filtered out of the trending content candidates for that domain.

At block 316, the remaining trending content candidates for the domain are optionally categorized according to domain categories. For example, a domain whose domains segment corresponds to news may be beneficially categorize trending content according to categories such as politics, US news, world news, sports, and the like. At block 318, the top trending content candidates for the currently iterated domain are selected. If categories have been applied to the trending content candidates, the selection of trending content candidates may include selecting top candidates from each of the categories for the currently iterated domain. At block 320, content snippets for each of selected trending content for the domain are generated. After having selected items of trending content for the currently iterated domain (along with snippets describing the items of trending content), at block 322, the next domain of the domains to be iterated is selected and the routine 300 returns again to block 312. Alternatively if there are no additional domains to process, the routine proceeds to block 324 where the selected items of trending content for the various domains is output. Thereafter, at block 326, the process delays for a predetermined amount of time before repeating by returning again to block 302.

Figure 8:
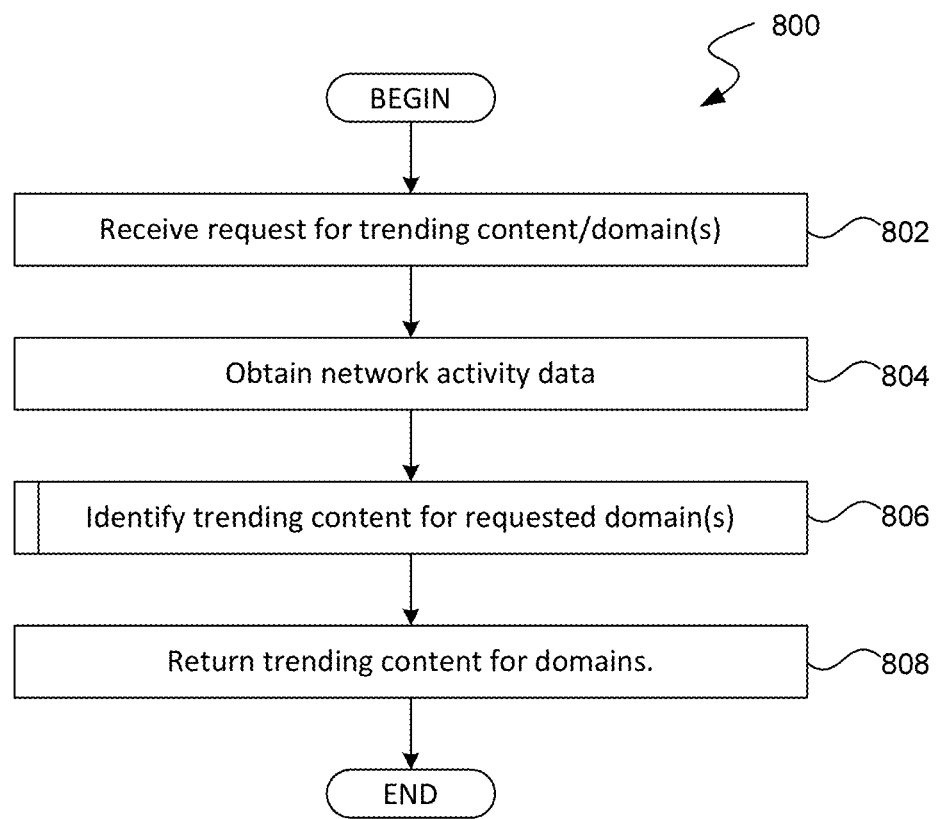
FIG. 8 is a flow diagram illustrating an exemplary routine for responding to a request for trending content on one or more domains.

Turning now to FIG. 8, FIG. 8 is a flow diagram illustrating an exemplary routine for responding to a request for trending content on one or more domains. Beginning at block 802, a request for trending content from one or more domains, or set of domains, is received. According to one embodiment, the request may include or identify the domains for which trending content is sought. Alternatively, the request may be a general request for trending content (without identifying any domains) such that a predetermined set of domains is used. At block 802, network activity data corresponding to the most recent prior period of time is obtained. At block 806, trending content for the requested domains is identified such as described above in regard to routine 300 of FIG. 3. At block 808, the trending content identified in block 806 is returned in response to the request, and the routine 800 terminates.

Figure 9:
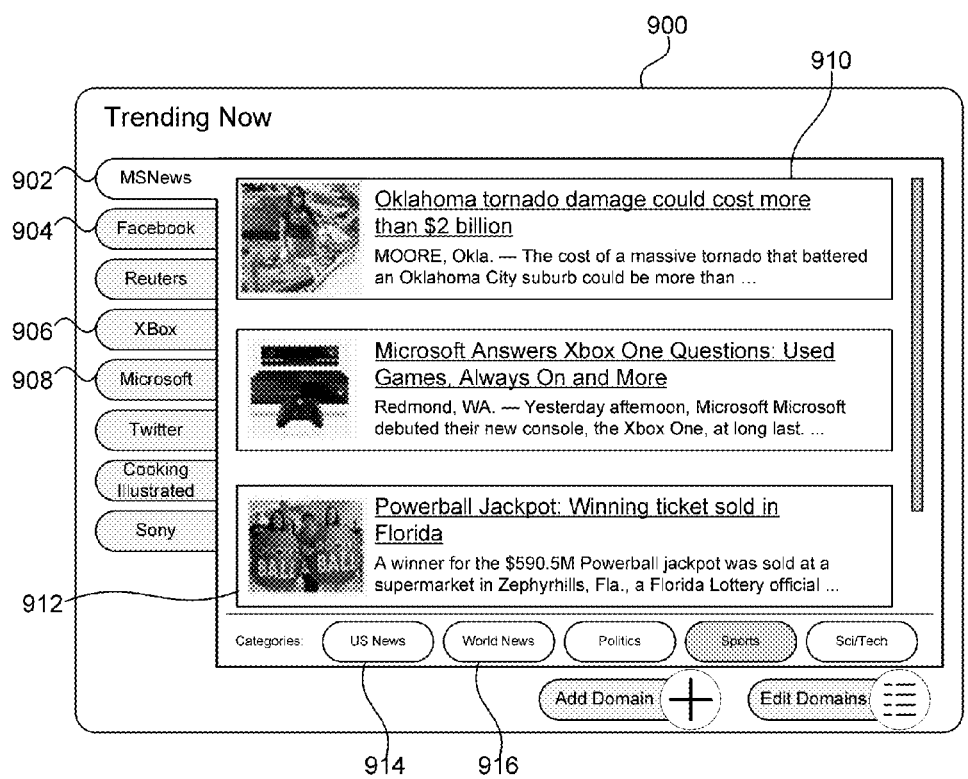
FIG. 9 is a pictorial diagram illustrating an exemplary application displaying trending content from multiple domains.

Turning now to FIG. 9, FIG. 9 is a pictorial diagram illustrating an exemplary application 900 displaying trending content from multiple domains as may be implemented on one or more user computers, such as user computers 102-106. More particularly, the application 900 includes tabs, such as tabs 902-908, corresponding various domains. As shown in application 900, tab 902 corresponding to "MSNews" is selected and displaying snippets of trending content, such as snippet 910 and 912, from the domain. In the example of an application 900, as the domain "MSNews" corresponds to a news segment the trending content selected for this domain are news related trending content items. Additionally, the application 900 provides user interface mechanisms, including buttons 914 and 916, for selecting which categories should be applied to this particular domain when selecting trending content items.

Figure 10:
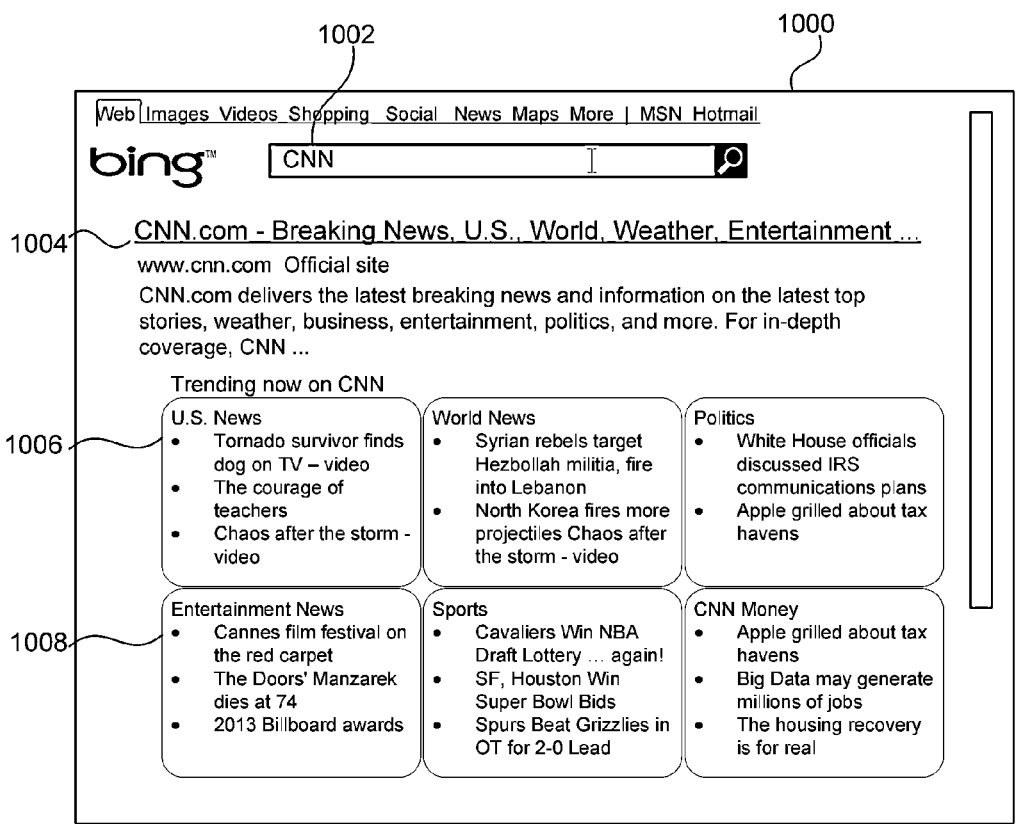
FIG. 10 is a pictorial diagram illustrating an exemplary search results page including trending news topics for a requested domain.

While FIG. 9 illustrates an example of an application 900 directed to providing trending content for various domains, it should be appreciated that it is an illustrative embodiment and not limiting upon the various uses of the disclosed subject matter. FIG. 10 illustrates an alternative use of the disclosed subject matter. More particularly, FIG. 10 is a pictorial diagram illustrating an exemplary search results page 1000 including trending news topics for a requested domain combined in search results, such as search result 1004, corresponding to a search request 1002 regarding a particular domain. As can be seen, in addition to one or more search results, the search results page 1000 includes various trending content tiles including trending content tiles 1006-1008, that identify trending content for the requested domain "CNN". More particularly the trending content tiles, including trending content tiles 1006-1008, are organized according to categories.

Figure 11:
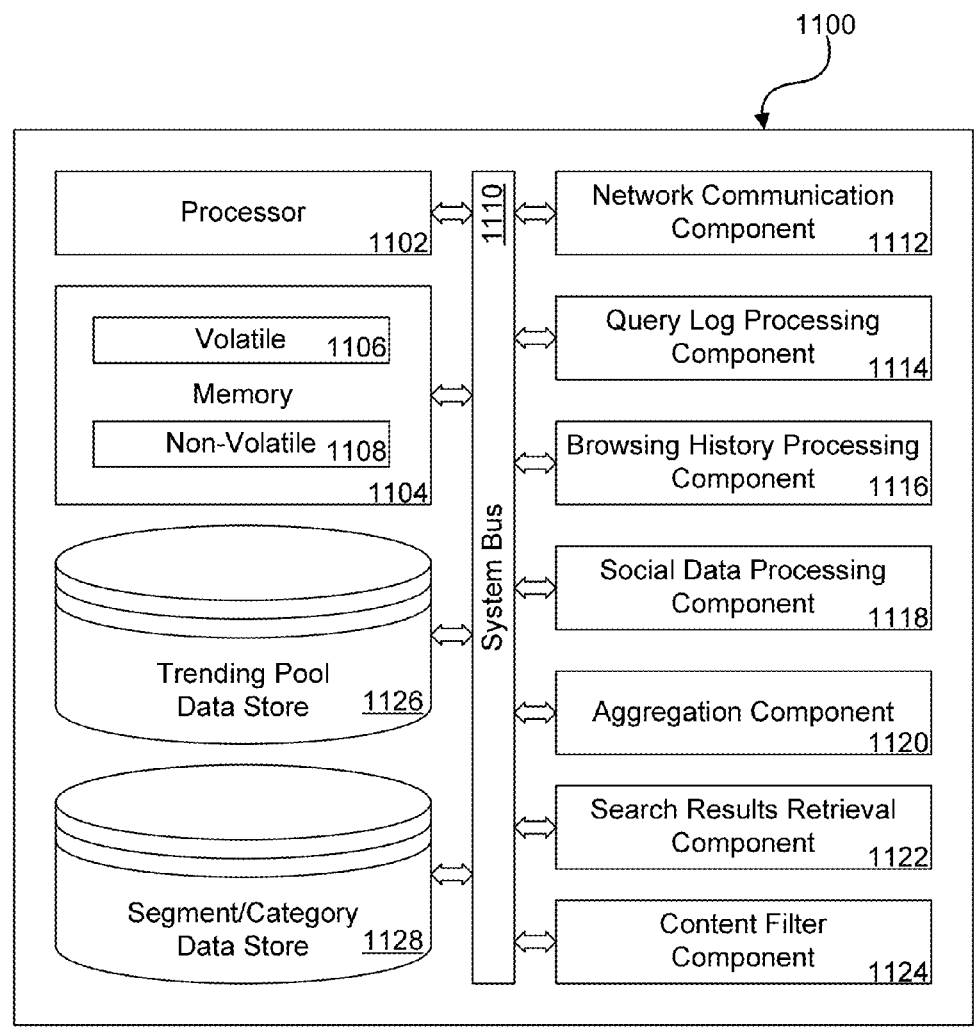
FIG. 11 is a block diagram illustrating various components of an exemplary computer system suitable for identifying trending topics of one or more domains on the Internet.

Turning now to FIG. 11, FIG. 11 is a block diagram illustrating various components of an exemplary computer system 1100 suitable for identifying trending topics of one or more domains on a network such as the Internet. As shown in FIG. 11, the computer system 1100 includes a processor 1102 (or processing unit) and a memory 1104 interconnected by way of a system bus 1110. As those skilled in the art will appreciated, memory 1104 typically (but not always) comprises both volatile memory 1106 and non-volatile memory 1108. Volatile memory 1106 retains or stores information so long as the memory is supplied with power. In contrast, non-volatile memory 1108 is capable of storing (or persisting) information even when a power supply is not available. Generally speaking, RAM and CPU cache memory are examples of volatile memory whereas ROM and memory cards are examples of non-volatile memory.

The processor 1102 executes instructions retrieved from the memory 1104 in carrying out various functions, particularly in responding to news requests with improved results through query expansion. The processor 1102 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); handheld computing devices such as smartphones, personal digital assistants, and the like; microprocessor-based or programmable consumer electronics; game consoles, and the like.

The system bus 1110 provides an interface for the various components to inter-communicate. The system bus 1110 can be of any of several types of bus structures that can interconnect the various components (including both internal and external components). The computer system 1100 further includes a network communication component 1112 for interconnecting the network site with other computers (including, but not limited to, user computers such as user computers 102-106, other network sites including network sites 110-116) as well as other devices on a computer network 108. The network communication component 1112 may be configured to communicate with other devices and services on an external network, such as network 108, via a wired connection, a wireless connection, or both.

The computer system 1100 also includes a query log processing component 1114. The query log processing component 1114 processes query logs 202 from the network activity data 222, as discussed above in regard to FIG. 4, to generate a set of trending content candidates. Further included in the computer system 1100 is a browsing history processing component 1116 that processes browsing data 204 from the network activity data 222, as discussed above in regard to FIG. 6, to generate a set of trending content candidates 214. Also included in the computer system 1100 is a social data processing component 1118 that processes social data 206 from the network activity dated 222, as discussed above in regard to FIG. 5, to generate a set of trending content candidates 214.

The computer system 1100 also includes an aggregation component 1120 that aggregates the trending content candidates 214 generated by each of the query log processing component 1114, the browsing history processing component 1116, and the social data processing component 1118. Also shown as a component of the computer system 1100 is a content filter component 1124 that works with the aggregation component 1120 in filtering trending content candidates according to domain segment information as well as categorizing trending content candidates according to various categories associated with a domain. As shown in the computer system 1100, domain segment and categories are stored in eight segment/category data store 1128. Also shown in the computer system 1100 is the trending content pool 1126 which holds one or more trending content candidates for use by the browsing history processing component 1116. The search results retrieval component 1122 operates in conjunction with the query log processing component 1114 two obtained search results from one or more search engines for the obtained search queries, as discussed above in regard to FIG. 4.

Those skilled in the art will appreciate that the various components of the computer system 1100 of FIG. 11 described above may be implemented as executable software modules within the computer system, as hardware modules (including SoCs—system on a chip), or a combination of the two. Moreover, each of the various components may be implemented as an independent, cooperative process or device, operating in conjunction with one or more computer systems. It should be further appreciated, of course, that the various components described above in regard to the computer system 1100 should be viewed as logical components for carrying out the various described functions. As those skilled in the art appreciate, logical components (or subsystems) may or may not correspond directly, in a one-to-one manner, to actual, discrete components. In an actual embodiment, the various components of each computer system may be combined together or broke up across multiple actual components and/or implemented as cooperative processes on a computer network 108.

Regarding the various routines described above, including routines 300-700, while these routines are expressed in regard to discrete steps, these steps should be viewed as being logical in nature and may or may not correspond to any actual and/or discrete steps of a particular implementation. Nor should the order in which these steps are presented in the various routines be construed as the only order in which the steps may be carried out. Moreover, while these routines include various novel features of the disclosed subject matter, other steps (not listed) may also be carried out in the execution of the routines. Further, those skilled in the art will appreciate that logical steps of these routines may be combined together or be comprised of multiple steps. Some or all of the steps of the various routines may be carried out in parallel or in series. Often, but not exclusively, the functionality of the various routines is embodied in software (e.g., applications, system services, libraries, and the like) that is executed on computer hardware and/or systems as described in regard to the computer system 1100 of FIG. 11. In various embodiments, all or some of the various routines may also be embodied in hardware modules, including system on chips, on a computer system.

While many novel aspects of the disclosed subject matter are expressed in routines embodied in applications (also referred to as computer programs), apps (small, generally single or narrow purposed, applications), services, and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions stored on the computer-readable storage devices are executed, they carry out various steps, methods and/or functionality, including those steps, methods, and routines described above in regard to routines 300-700. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for identifying trending content, the method comprising:
   receiving a request for trending content;
   obtaining network activity data corresponding to network activity of a recent period of time, wherein the network activity data comprises browsing data of browsing history of a first plurality of computer users of the recent time period;
   identifying trending content from the network activity data for each domain of the set of domains, wherein identifying the trending content comprises:
      organizing the browsing data according to a network location of each item of browsing data; and
      for each network location of the resulting from organizing the browsing data, adding the network location to a trending content pool when a browsing volume of the network location during a first time period of the recent period of time meets a first threshold volume;
      organizing the network locations in the trending content pool according to a domain of each network location; and
      from each domain resulting from organizing the network locations in the trending content pool according to domain, identifying trending content for the corresponding domain; and
   returning at least some of the identified trending content in response to the request.

2. The computer implemented method of claim 1, wherein the network activity data further comprises query logs of search queries obtained from one or more search engines of a second plurality of computer user; and
   wherein identifying trending content from the network activity data for each domain of the set of domains further comprises:
      identifying a set of trending content candidates from the query logs;
      aggregating the set of trending content candidates with the identified trending content; and
   returning at least some of the aggregated trending content in response to the request.

3. The computer implemented method of claim 2, wherein identifying the set of trending content candidates from the query logs comprises:
   grouping similar search queries from the query logs;
   filtering out search queries whose volume falls below a query volume threshold;
   obtaining search results for the filtered search queries, each search result having an associated score and each search result referencing content at a location on a domain, and grouping the search results according to the location of the referenced content; and
   for each domain of the set of domains, selecting the highest scoring content as the set of trending content candidates for the domain.

4. The computer implemented method of claim 2, wherein identifying trending content for the corresponding domain comprises:
   for each domain resulting from organizing the network locations in the trending content pool according to domain, selecting the highest scoring content as the identified trending content for the domain.

5. The computer implemented method of claim 4, further comprising:
   for each network location of the obtained browsing data, adding the network location to the trending content pool when the browsing volume of the network location of a second time period of the recent period of time meets a second threshold volume.

6. The computer implemented method of claim 4, further comprising:
   for each network location of the obtained browsing data, adding the network location to the trending content pool when the browsing volume of the network location of a third time period of the recent period of time meets a third threshold volume.

7. The computer implemented method of claim 6, further comprising:
   for each network location in the trending content pool, removing the network location from the trending content pool when the browsing volume of the network location of a fourth period of time fails to meet a fourth threshold volume.

8. The computer implemented method of claim 2, further comprising filtering the aggregated set of trending content candidates according to domain segment and category data.

9. The computer implemented method of claim 2, wherein the set of domains comprises a user-specified set of domains in the request for trending content.

10. A computer readable medium excluding transmission signals bearing computer executable instructions which, when executed on a computing system comprising at least a processor executing instructions retrieved from the medium, carry out a method for identifying trending topics, the method comprising:
   receiving a request for trending content;
   obtaining network activity data corresponding to network activity of a recent period of time, wherein the network activity data comprises query logs of search queries obtained by one or more search engines and browsing data of browsing history of a plurality of computer users;
   identifying a first set of trending content candidates from the query logs;
   identifying a second set of trending content candidates from the browsing data, wherein identifying the second set of trending content candidates from the browsing data comprises:
      organizing the browsing data according to a network location; and
      for each network location of the browsing data, adding the network location to a trending content pool when browsing volume of the network location during a first period of the recent period of time meets a first threshold volume;
   aggregating the first and second sets of trending content candidates according to the domains of the trending content candidates;
   for each domain of the set of domains, identifying a subset of the trending content candidates for the domain from the aggregated set of trending content candidates as the trending content for the domain; and
   returning the identified content in response to the request.

11. The computer readable medium of claim 10, wherein identifying a first set of trending content candidates from the query logs comprises:
   grouping similar search queries from the query logs;
   filtering out search queries whose volume falls below a query volume threshold;
   obtaining search results for the filtered search queries, each search result having an associated score and each search result referencing content at a location on a domain, and grouping the search results according to the location of the referenced content; and
   for each domain of the set of domains, selecting the highest scoring content as the first set of trending content candidates for the domain.

12. The computer readable medium of claim 11, wherein identifying the second set of trending content candidates from the browsing data comprises:
   adding the network location to the trending content pool when the browsing volume of the network location of a second period of the recent period of time meets a second threshold volume;
   adding the network location to the trending content pool when the browsing volume of the network location of a third period of the recent period of time meets a third threshold volume; and
   for each domain of the set of domains, selecting highest scoring content as the second set of trending content candidates for the domain.

13. The computer readable medium of claim 12, the method further comprising:
   for each network location in the trending content pool, removing the network location from the trending content pool when the browsing volume of the network location of a fourth period of time fails to meet a fourth threshold volume.

14. A computer system for identifying trending topics, the computer system comprising a processor and a memory, wherein the processor executes instructions stored in the memory as part of or in conjunction with additional components to identify trending topics on one or more domains, the additional components comprising:
   a network communication component configured to communicate with one or more external devices over a network, and where the system is configured to obtain network activity data corresponding to network activity of a recent period of time, wherein the network activity data comprises query logs of search queries obtained one or more search engines and browsing data of browsing history of a plurality of computer users;
   a query log processing component to identify a first set of trending content candidates from the query logs of the network activity data;
   a browsing history processing component to identify a second set of trending content candidates from the browsing data of the network activity data, wherein identifying the second set of trending content candidates from the browsing data comprises:
      organizing the browsing data according to a network location; and
      for each network location of the browsing data, adding the network location to a trending content pool when browsing volume of the network location during a first period of time of the recent period of time meets a first threshold volume; and
   an aggregation component configured to:
      aggregate the first and second sets of trending content candidates according to the domain of the trending content candidates; and
      for each domain of the set of domains, identify a subset of the trending content candidates for the domain from the aggregated set of trending content candidates as the trending content for the domain;
   wherein the computer system is further configured return the identified trending content in response to a request for trending content.

15. The computer system of claim 14, wherein the query log processing component is configured to identify the first set of trending content candidates from the query logs of the network activity data by:
   grouping similar search queries from the query logs;
   filtering out search queries whose volume falls below a query volume threshold;
   obtaining search results for the filtered search queries, each search result having an associated score and each search result referencing content at a location on a domain, and grouping the search results according to the location of the referenced content; and
   for each domain of the set of domains, selecting highest scoring content as the first set of trending content candidates for the domain.

16. The computer system of claim 15, wherein the browsing history processing component is configured to identify the second set of trending content candidates from the social network data of the network activity data by:

adding the network location to the trending content pool when the browsing volume of the network location of a second period of time of the recent period of time meets a second threshold volume;

adding the network location to the trending content pool when the browsing volume of the network location of a third period of time of the recent period of time meets a third threshold volume; and for each domain of the set of domains, selecting highest scoring content as the second set of trending content candidates for the domain.

* * * * *